US 8,312,157 B2

(12) United States Patent  
Jakobsson et al.

(10) Patent No.: US 8,312,157 B2  
(45) Date of Patent: Nov. 13, 2012

(54) IMPLICIT AUTHENTICATION

(75) Inventors: Bjorn Markus Jakobsson, Mountain View, CA (US); Mark J. Grandcolas, Burlingame, CA (US); Philippe J. P. Golle, San Francisco, CA (US); Richard Chow, Sunnyvale, CA (US); Runting Shi, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 645 days.

(21) Appl. No.: 12/504,159

(22) Filed: Jul. 16, 2009

(65) Prior Publication Data

US 2011/0016534 A1 Jan. 20, 2011

(51) Int. Cl.  
*G06F 15/16* (2006.01)
(52) U.S. Cl. ............... 709/229; 709/217; 726/2; 726/3; 726/7; 726/30; 705/51
(58) Field of Classification Search .............. 705/64–67; 726/7, 26, 27

See application file for complete search history.

(56) References Cited

U.S. PATENT DOCUMENTS

| | | | | |
|---|---|---|---|---|
| 6,098,052 A * | 8/2000 | Kosiba et al. | .................... | 705/40 |
| 6,282,658 B2 * | 8/2001 | French et al. | .................... | 726/7 |
| 6,496,936 B1 * | 12/2002 | French et al. | .................... | 726/7 |
| 7,016,809 B1 * | 3/2006 | Gotwals et al. | ............... | 702/185 |
| 7,086,085 B1 * | 8/2006 | Brown et al. | .................... | 726/7 |
| 7,284,124 B1 * | 10/2007 | Ginsberg | .................... | 713/167 |
| 7,305,701 B2 * | 12/2007 | Brezak et al. | .................... | 726/5 |
| 7,571,472 B2 * | 8/2009 | Royer | ............................ | 726/19 |
| 7,636,853 B2 * | 12/2009 | Cluts et al. | .................... | 713/186 |
| 7,689,716 B2 * | 3/2010 | Short et al. | .................... | 709/246 |
| 7,748,029 B2 * | 6/2010 | Ross | ................................ | 726/6 |
| 7,856,384 B1 * | 12/2010 | Kulasooriya et al. | ........... | 705/35 |
| 7,877,611 B2 * | 1/2011 | Camacho et al. | ............. | 713/182 |
| 7,890,363 B2 * | 2/2011 | Gross | .......................... | 705/7.31 |
| 7,958,552 B2 * | 6/2011 | Arnold et al. | ................... | 726/17 |
| 8,065,227 B1 * | 11/2011 | Beckman | ....................... | 705/39 |
| 2003/0208684 A1 * | 11/2003 | Camacho et al. | ............. | 713/186 |
| 2005/0097320 A1 * | 5/2005 | Golan et al. | ................... | 713/166 |
| 2006/0273152 A1 * | 12/2006 | Fields | .......................... | 235/380 |
| 2007/0133768 A1 * | 6/2007 | Singh | ....................... | 379/114.14 |

(Continued)

OTHER PUBLICATIONS

Weisstein, Eric W. "Quartile" From Mathworld—A Wolfram Web Resource. http://mathworld.wolfram.com/quartile.html. downloaded Jul. 16, 2009.

(Continued)

*Primary Examiner* — Mamon Obeid  
(74) *Attorney, Agent, or Firm* — Shun Yao; Park, Vaughan, Fleming & Dowler LLP

(57) ABSTRACT

Embodiments of the present disclosure provide a method and system for implicitly authenticating a user to access controlled resources. The system receives a request to access the controlled resources. The system then determines a user behavior score based on a user behavior model, and recent contextual data about the user. The user behavior score facilitates identifying a level of consistency between one or more recent user events and a past user behavior pattern. The recent contextual data, which comprise a plurality of data streams, are collected from one or more user devices without prompting the user to perform an action explicitly associated with authentication. The plurality of data streams provide basis for determining the user behavior score, but a data stream alone provides insufficient basis for the determination of the user behavior score. The system also provides the user behavior score to an access controller of the controlled resource.

23 Claims, 11 Drawing Sheets

U.S. PATENT DOCUMENTS

| | | | |
|---|---|---|---|
| 2007/0177768 A1* | 8/2007 | Tsantes et al. | 382/115 |
| 2007/0288319 A1* | 12/2007 | Robinson et al. | 705/14 |
| 2008/0103800 A1* | 5/2008 | Domenikos et al. | 705/1 |
| 2008/0162383 A1* | 7/2008 | Kraft | 705/500 |
| 2008/0189776 A1* | 8/2008 | Constable | 726/7 |
| 2009/0006230 A1* | 1/2009 | Lyda et al. | 705/35 |
| 2009/0171723 A1* | 7/2009 | Jenkins | 705/7 |
| 2009/0198587 A1* | 8/2009 | Wagner et al. | 705/26 |
| 2010/0122347 A1* | 5/2010 | Nadler | 726/26 |
| 2011/0055373 A1* | 3/2011 | Bnayahu et al. | 709/224 |
| 2011/0265162 A1* | 10/2011 | Alavandar et al. | 726/7 |

OTHER PUBLICATIONS

Nisenson, Mordechai et al., "Towards Behaviometric Security Systems: Learning to Identify a Typist", PKDD 2003, LNAI 2838, pp. 363-374, 2003.

\* cited by examiner

PHONE NUMBER 700

| A01 | WIFE | (111)111-1111 |
|---|---|---|
| A02 | MOTHER | (222)222-2222 |
| A03 | DAUGHTER | (333)333-3333 |
| A04 | SON | (444)444-4444 |
| A05 | COWORKER | (555)555-5555 |
| ... | ... | ... |

CALL TYPE 710

| B01 | INCOMING |
|---|---|
| B02 | OUTGOING |
| B03 | MISSED |
| B04 | FORWARDING |
| B05 | CONFERENCING |
| ... | ... |

DURATION 720

| C01 | < 5 MINS |
|---|---|
| C02 | 5-10 MINS |
| C03 | 10-30 MINS |
| C04 | 30-60 MINS |
| C05 | > 60 MINS |
| ... | ... |

LOCATION 730

| D01 | UNREGISTERED | (-1, -1) |
|---|---|---|
| D02 | HOME | (47W, 63N) |
| D03 | SCHOOL | (43W, 29N) |
| D04 | WORK | (48W, 61N) |
| D05 | GROCERY STORE | (46W, 63N) |
| ... | ... | ... |

MOVEMENT 740

| E01 | UNDETECTED |
|---|---|
| E02 | STATIC |
| E03 | SLOW |
| E04 | MEDIUM |
| E05 | FAST |
| ... | ... |

IDENTITY CONFIDENCE 750

| F01 | > 95% |
|---|---|
| F02 | 90-95% |
| F03 | 80-90% |
| F04 | 70-80% |
| F05 | < 10% |
| ... | ... |

USER BEHAVIOR MODEL 760

| 001 | A01 | B01 | C05 | D02 | E01 | F01 |
|---|---|---|---|---|---|---|
| 002 | A01 | B02 | C02 | D05 | E02 | F02 |
| 003 | A02 | B01 | C03 | D02 | E03 | F03 |
| 004 | A05 | B04 | C02 | D04 | E02 | F04 |
| 005 | A05 | B02 | C05 | D01 | E05 | F05 |
| ... | ... | ... | ... | ... | ... | ... |

FIG. 7A

IMPLICIT AUTHENTICATION

BACKGROUND

1. Field

This disclosure is generally related to user authentication. More specifically, this disclosure is related to a method and system for implicitly authenticating a user to access a controlled resource based on contextual data indicating the user's behavior.

2. Related Art

A Mobile Internet Device (MID) is a multimedia-capable handheld computer providing wireless Internet access. MIDs are designed to provide entertainment, information and location-based services for personal use. As the market of MIDs expands, mobile commerce (also known as M-commerce) is experiencing rapid growth. There is a trend toward hosting applications and services on the Internet. This results in increased demand for Internet authentication—whether of devices, computers or users. Moreover, the use of digital rights management (DRM) policies will likely increase the need for frequent authentications. Some of such authentications may happen simultaneously due to the increased use of mashups.

On the other hand, the shift toward greater market penetration of MIDs complicates password entry due to the limitations of MID input interfaces. Typing passwords on mobile devices, such as an iPhone™ or a BlackBerry™, can become a tedious and error-prone process.

Single sign-on (SSO) is an authentication mechanism to control the access of multiple, related, but independent software applications and services. With SSO, a user logs in once and gains access to all applications and services without being prompted to log in again at each of them. SSO addresses the problem of frequent authentications. However, SSO does not defend against theft and compromise of devices because it only vouches for the identity of the device, not its user.

SUMMARY

One embodiment provides a system that implicitly authenticates a user of a Mobile Internet Device to access a controlled resource. The system first receives a request to access the controlled resource. Then, the system determines a user behavior score based on a user behavior model and recent contextual data, wherein the user behavior score facilitates identifying a level of consistency between one or more recent user events and a past user behavior pattern. The user behavior model is derived from historical contextual data of the user. The recent contextual data are recent data of the user collected from one or more user mobile devices indicating the user's recent behavior or one or more recent user events. The recent contextual data can be collected without prompting the user to perform an action explicitly associated with authentication. Further, the recent contextual data include multiple data streams, which provide basis for the determination of the user behavior score. However, a data stream alone provides insufficient basis for the determination of the user behavior score. Next, the system provides the user behavior score to an access controller of the controlled resource, thereby making an authentication decision derived from the user behavior score for the user to access the controlled resource based at least on the user behavior score. In addition, the system can be used in combination with another form of authentication.

In some embodiments, the system also collects contextual data of the user periodically from one or more user devices, and updates the user behavior model based on the collected contextual data of the user.

In some embodiments, the system also determines an action based on the user behavior score. The action can be a demand for a further authentication.

In some embodiments, the system also determines whether the user behavior score is higher than a predetermined threshold value, and if so, authenticates the user to access the controlled resource using the authentication decision derived from the user behavior score.

In some embodiments, the system also uses the authentication decision derived from the user behavior score to increase or decrease an assurance associated with another form of authentication.

In some embodiments, the system also:
  observes the recent event associated with the recent contextual data of the user;
  calculates a quality measure associated with the recent event;
  calculates a weight associated with the type of observation;
  determines whether the observed event is consistent with the user behavior model; and
  increases (if consistent) or decreases (if inconsistent) the user behavior score based on the quality measure and the weight.

In some embodiments, the system also determines that the user behavior score is lower than a predetermined threshold value, and requests the user to provide a user credential, thereby explicitly authenticating the user to access the controlled resource.

In some embodiments, the system collects the contextual data with a number of measurements. The user behavior model describes the past user behavior pattern by a combination of one or more measurements.

In some embodiments, the recent contextual data of the user are data from at least one of the following sources:
  device data that are available on a user device;
  carrier data that are available to a network carrier; and
  third-party provider data that are available to a third-party provider providing an application to the user.

In some embodiments, the recent contextual data of the user comprise one or more of: GPS data, accelerometer data, voice data, sensor data, application usage data, web browser data, authentication attempts, connection attempts, network traffic pattern, DNS requests, typing pattern, biometric data, social group membership information, and user demographics data.

In some embodiments, the user behavior model is stored in a user model look-up table. The user model look-up table comprises historical information on whether a condition is satisfied, and information on a plurality of user events. Each event is associated with a probability distribution and a score distribution.

In some embodiments, the system collects historical contextual data via one or more of a survey of contextual information about the user entered by a representative of the user, an accumulation of periodically transmitted contextual data of the user from one or more mobile devices, or an inheritance of the contextual information about the user from another device associated with the user.

In some embodiments, the system derives the user behavior model from a second model of a group of users sharing similar characteristics.

In some embodiments, the recent event belongs to one of a plurality of categories. The plurality of categories comprise one or more of: (1) a very positive event; (2) a positive event; (3) a neutral event; (4) a negative event; and (5) a very negative event. The determination of increasing or decreasing the user behavior score and the amount of increment or decrement are associated with the category to which the recent event belongs.

BRIEF DESCRIPTION OF THE FIGURES

FIG. 7A shows a diagram of a user behavior model describing the user's historical behavior patterns in accordance with an embodiment of the present invention.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method for implicitly authenticating a user to access a controlled resource without the need for entering passwords or answering any authentication questions. In addition, the method can be used as a second-factor mechanism for authentication in combination with another authentication method.

In one embodiment, a mobile device automatically detects the environment that a user is in, and the activities that the user is engaged in. If the environment and the activities exhibit familiar patterns (for example, if the user is detected to be in her home, or if the user has just made a ten-minute phone call to her significant other), then it is deemed safe to authenticate the user without prompting for a password or security question. On the other hand, if the detected environment and activities associated with the user exhibit anomalies or deviations from the user's normal behavior, it is deemed unsafe to grant access to the user, as the device may have been lost or stolen.

Furthermore, the system can periodically collect contextual data of the user from one or more user devices. The system can then update the user behavior model based on the periodically collected contextual data.

In some embodiments, the system calculates a user behavior score based on a user behavior model derived from historical contextual data of the user, recent contextual data of the user collected from one or more user devices, and optionally a request to access controlled resources from the user. If the user behavior score is higher than a predetermined threshold, the system authenticates the user to access the controlled resource. If the user behavior score is lower than the predetermined threshold, the system requires the user to be authenticated explicitly, for example, by requesting the user to provide a user credential to access the controlled resource.

Figure 1A:
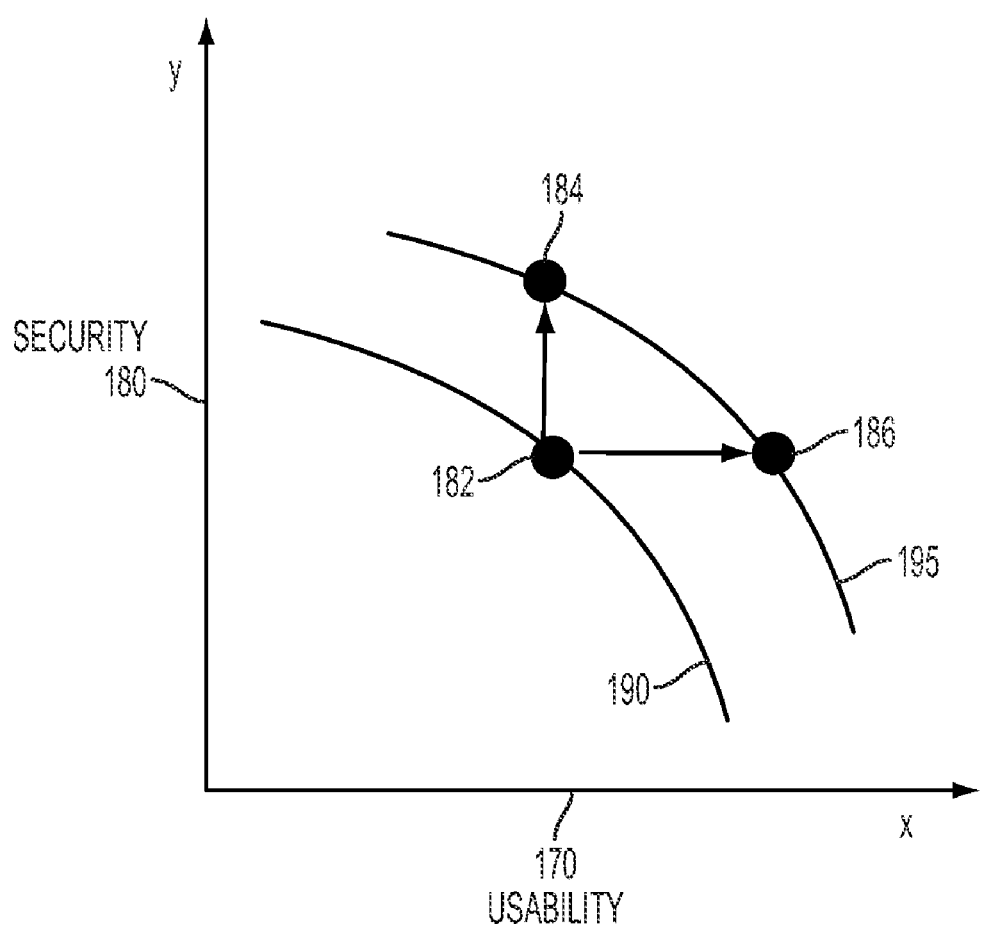
FIG. 1A shows a diagram of the usability and security of different authentication techniques.

FIG. 1A shows a diagram illustrating usability 170 and security 180 of different authentication techniques. In this diagram, the x-axis represents usability 170 and the y-axis represents security 180. Curve 190 represents an inverse relationship between usability and security associated with a conventional authentication technique. For example, point 182 on curve 190 has a coordinate of ($X_{182}$, $Y_{182}$). That means for a given level of usability $X_{182}$, the conventional technique can achieve a certain degree of security $Y_{182}$. With the conventional technique, in order to make the systems more user-friendly, the degree of security of the systems typically decreases accordingly. Likewise, in order to make a conventional system more secure, the level of usability of the system will typically decrease.

Curve 195 represents a relationship between usability and security associated with embodiments of the present invention, which uses implicit authentication. Implicit authentication may be used as a complement to or a replacement for traditional password authentication.

Point 184 on curve 195 represents the usability/security tradeoff when implicit authentication is used as a complement to the traditional password authentication. Point 184 shares the same x-coordinate as point 182 on curve 190, which means the level of usability does not change. However, point 184 has a larger y-coordinate compared to point 182, which means systems, which are used as complements to conventional forms of authentication, in accordance with the present invention increase the degree of security when the level of usability remains the same as conventional systems. The systems can use the implicit authentication decision to authenticate the user to access the controlled resource.

Point 186 on curve 195 represents the usability/security tradeoff when implicit authentication is used as a replacement for the traditional password authentication. Point 186 shares the same y-coordinate as point 182 on curve 190, which means the degree of security does not change. However, point 186 has a larger x-coordinate compared to point 182, which means systems, which are used as replacements of conventional forms of authentication, in accordance with the present invention increase the level of usability when the degree of security remains the same as conventional systems. The systems can use the implicit authentication decision to increase or decrease an assurance level associated with another form of authentication, e.g. password.

Computing Environment

Figure 1B:
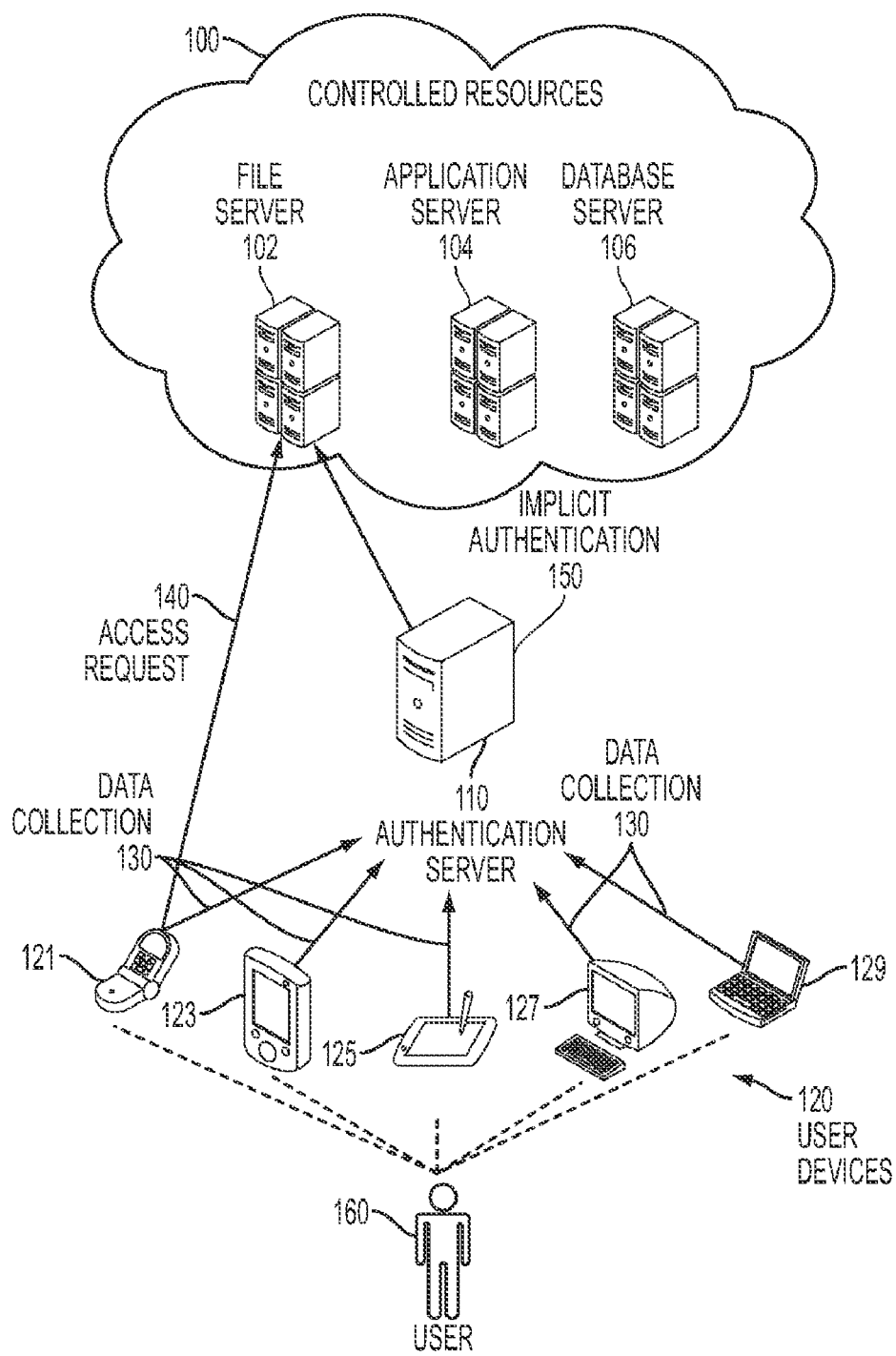
FIG. 1B shows a schematic diagram of a system for implicitly authenticating a user to access a controlled network resource in accordance with an embodiment.

FIG. 1B shows a schematic diagram of a computing environment for implicitly authenticating a user to access a controlled network resource in accordance with an embodiment of the present invention. In this example, the computing environment includes controlled resources 100, an authentication server 110, a plurality of user devices 120 and a user 160. Controlled resources 100 can include any resources on a network, and a mechanism for providing access to such resources upon receiving requests from a user. For example, controlled resources 100 may include, but are not limited to, a file server 102, an application server 104, a database server 106, a mail server (not shown), etc. Authentication server 110 can be any type of computational device capable of performing an authorization or authentication operation of a user or a transaction. User devices 120 can generally include any node on a network including computational capability, a mechanism for communicating across the network, and a human interaction interface. This includes, but is not limited to, a smart phone device 121, a personal digital assistant (PDA) 123, a tablet PC 125, a workstation 127, a laptop 129, etc. Note that although the present invention optimally is used with mobile Internet devices, it can be used with any type of computational devices.

During operation, a user 160 sends a request 140 to access a network resource 100. Authentication server 110 collects contextual data about the user 160 from user devices 120 (operation 130), and presents implicit authentication information 150 to the access controller of controlled resource 100 to facilitate authentication of the user 160. In one embodiment, authentication server 110 collects contextual data about the user 160 after controlled resource 100 receives the access request 140 from user devices 120. In one embodiment, authentication server 110 collects contextual data from user devices 120 and periodically updates a user behavior model about user 160.

Figure 1C:
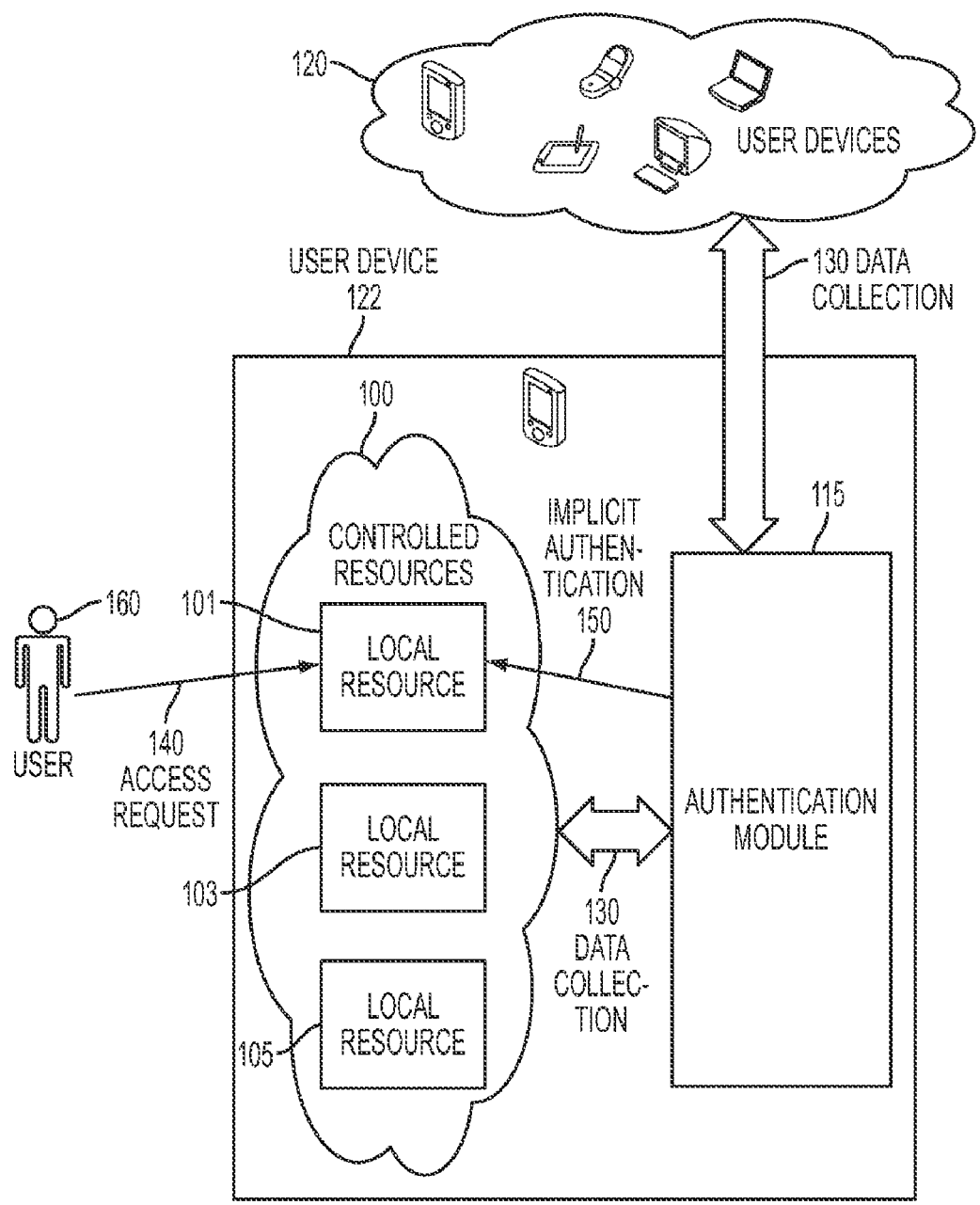
FIG. 1C shows a schematic diagram of a computing environment for implicitly authenticating a user to access a controlled local resource in accordance with an embodiment of the present invention.

FIG. 1C shows a schematic diagram of a system for implicitly authenticating a user to access a controlled local resource in accordance with an embodiment. In this embodiment, the computing environment includes a user 160, a specific user device 122 with controlled resources 100 and a plurality of other user devices 120. The specific user device 122 includes controlled resources 100 and authentication module 115. Controlled resources 100 can include any local resources located on the specific user device 122 and a mechanism for providing access to such resources upon receiving requests from user 160. Controlled resources 100 may include, but are not limited to, a local file 101, a local application 103, a local database 105, an email message (not shown), etc. Authentication module 115 can be any type of computational module capable of authenticating a user or a transaction. Other user devices 120 can generally include any node on a network that user 160 has access to. Such devices include, but are not limited to, a smart phone device, a PDA, a tablet PC, a workstation, a laptop, etc.

During operation, user 160 sends a request 140 to access local resource 100. Authentication module 115 collects contextual data about user 160 from other user devices 120 as well as controlled local resources 100 (operation 130), and presents implicit authentication information 150 to the access controller of controlled resource 100 to facilitate authentication of user 160.

Implicit Authentication

Figure 2:
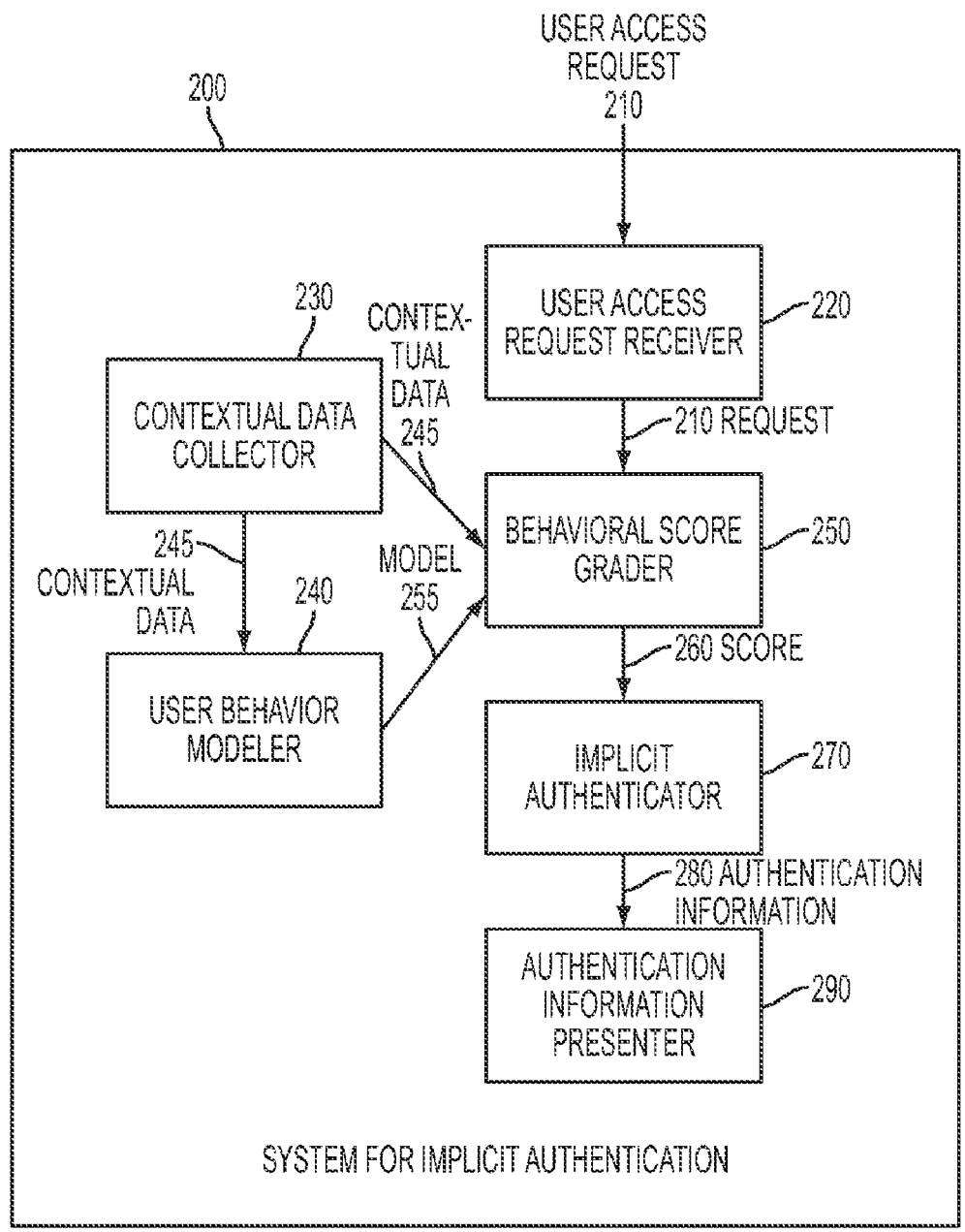
FIG. 2 shows a block diagram of a computing environment for implicitly authenticating a user to access a controlled resource in accordance with an embodiment of the present invention.

FIG. 2 shows a block diagram of a system 200 for implicitly authenticating a user to access a controlled resource in accordance with an embodiment. System 200 includes a user access request receiver 220, a behavioral score grader 250, an implicit authenticator 270, and an authentication information presenter 290. System 200 additionally includes a contextual data collector 230 and a user behavior modeler 240.

User access request receiver 220 receives user access request 210 from a user 160, and can be a network port, a wireless receiver, a radio receiver, a media receiver, etc., without any limitations. User access request 210 may be received from user 160, from a resource controller, or from another module that is capable of passing the request. User access request receiver 220 receives and analyzes the user access request 210 and forwards request 210 to the behavioral score grader 250. In some embodiments, user 160 may not be issuing any request, and the user's device may be a passive responder. Also, the device may be non-operative and/or non-reachable at the time of the request, but have recently communicated its state.

Behavioral score grader 250 calculates a behavioral score of user 160, and can be any computing device with a processing logic and a communication mechanism. Behavioral score grader 250 receives forwarded user access request 210, recent data 245 from contextual data collector 230, and a user behavior model 255 from user behavior modeler 240. Behavioral score grader 250 then calculates a user behavioral score 260 based on the request 210, the recent contextual data 245, and user behavior model 255. User behavior score 260 indicates the likelihood that user 160 who sends user access request 210 from a user device is the owner of the user device. User behavior score 260 can be adjusted upwards or downwards based on a sequence of observed events associated with the user device. User behavior score 260 is then sent to implicit authenticator 270 to facilitate implicit authentication of the user.

Contextual data collector 230 collects contextual data about user 160, and can be any device with a storage and a communication mechanism. Contextual data 245 are data that serve to indicate a user's behavior or environment. Examples of contextual data 245 include locations, movements, actions, biometrics, authentication outcomes, application usage, web browser data (e.g., recently visited sites), etc. Contextual data 245 can be collected from a device, a carrier, and/or a third-party provider. Contextual data collector 230 sends the collected recent contextual data 245 to behavioral score grader 250, as well as user behavior modeler 240.

The user behavior modeler 240 creates a user behavior model 255 based on the contextual data 245 about user 160. User behavior model 255 describes a user's historical behavior patterns. User behavior model 255 can include a history string which corresponds to a sequence of observed events, a probability distribution which corresponds to the likelihood of the observed events happening as a function of time, and a score distribution which corresponds to the change in user behavior score 260 resulting from the observed events as a function of time. User behavior modeler 240 can be any type of computing device or component with a computational mechanism.

Implicit authenticator 270 calculates implicit authentication information 280 based on user behavioral score 260. Implicit authentication information 280 is information that facilitates the access controller of controlled resources to make an authentication decision. Implicit authentication information 280 can be a binary decision or a confidence level based on user behavior score 260. Implicit authentication information presenter 290 presents implicit authentication information 280 to the access controller of controlled resources.

Figure 3:
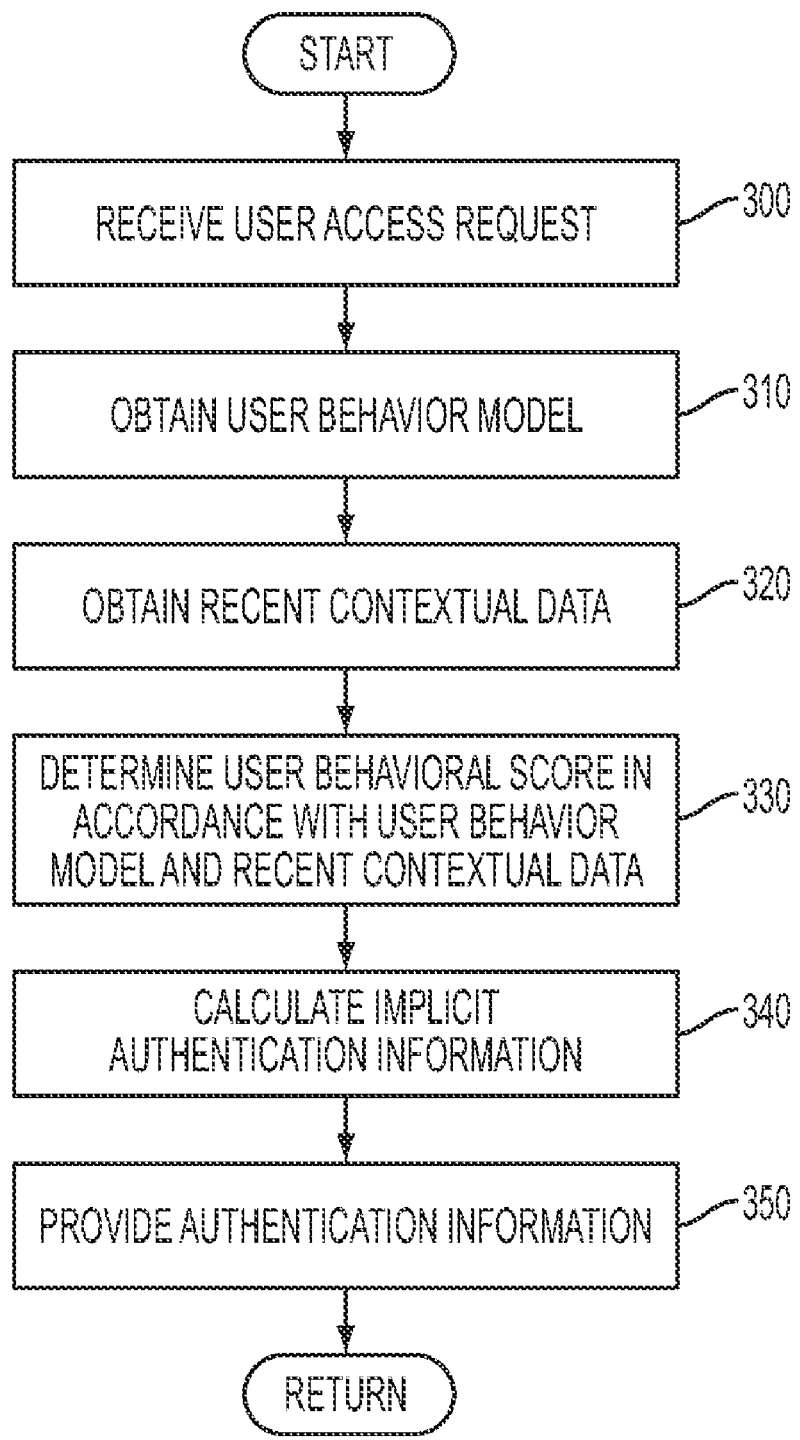
FIG. 3 shows a flow chart illustrating a method for implicitly authenticating a user to access a controlled resource in accordance with an embodiment of the present invention.

FIG. 3 shows a flow chart illustrating a method for implicitly authenticating a user to access a controlled resource in accordance with an embodiment.

During operation, the system receives a user access request (operation 300). The user access request can contain login credentials for resource authentication. In other embodiments, the user access request can merely identify the resource to be accessed without providing any login credentials or authentication information.

The system then obtains a user behavior model (operation 310) associated with the user who sends the access request. The system also obtains recent contextual data (operation 320) associated with the user. Based on the request, the user behavior model, and the recent contextual data (which describes recent user behavior), the system determines a user behavioral score (operation 330). The user behavioral score indicates whether the user's recent behavioral data fit the user's behavioral pattern as described by the user behavior model, and a level of consistency between the user's recent contextual behavioral data and the user behavior model. Note that for the same set of recent contextual data and user behavior model, the user behavioral score may vary depending on the nature of the request.

Next, the system calculates implicit authentication information (operation 340). The implicit authentication information can be a binary authentication decision, or a confidence level. Finally, the system presents the authentication information to the resource controller, the user, or another external client (operation 350).

User Behavior Score

Figure 4:
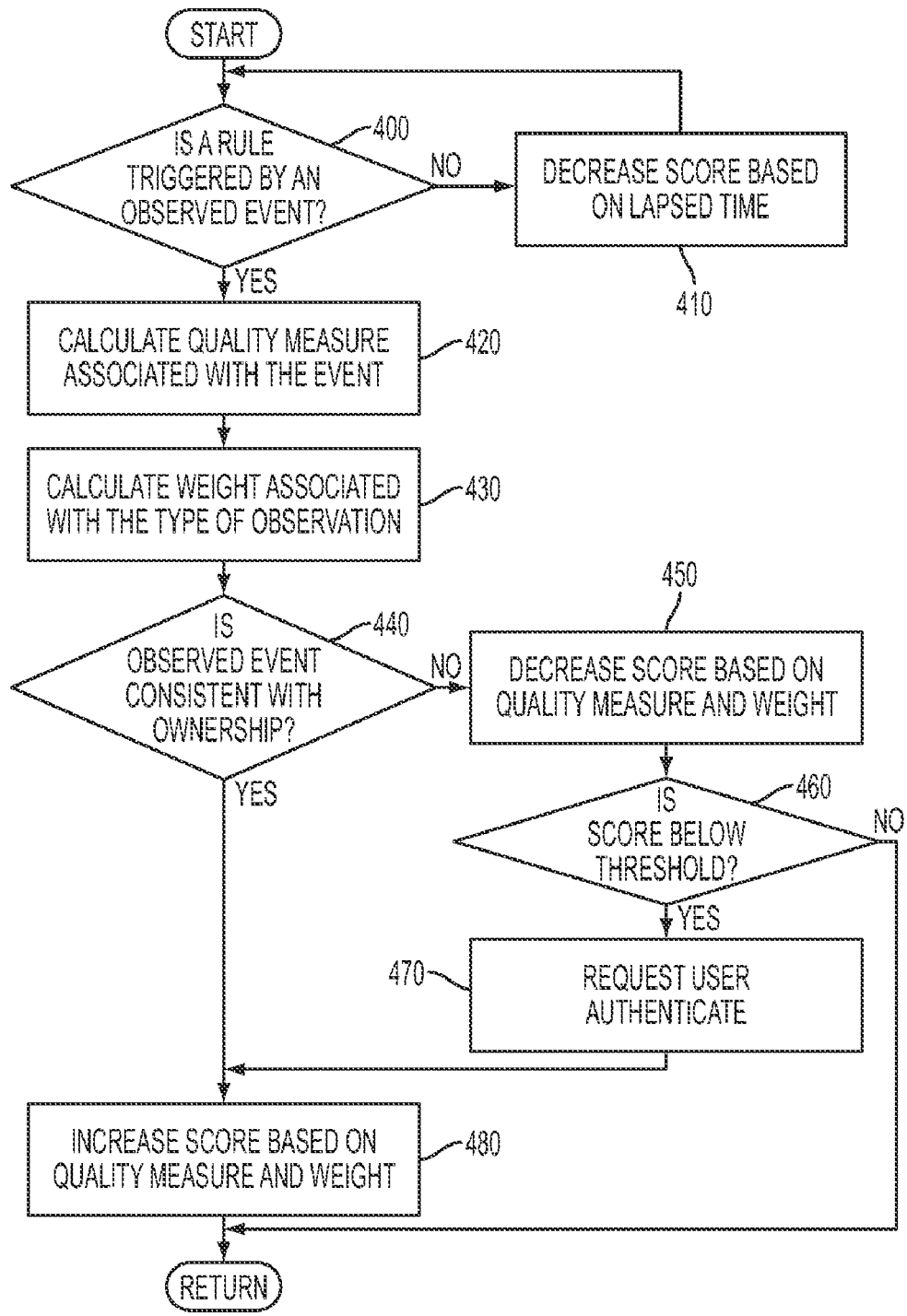
FIG. 4 shows a flow chart illustrating the determination of a user behavior score based on the user behavior model and recent contextual user behavioral data in accordance with an embodiment of the present invention.

FIG. 4 shows a flow chart illustrating the determination of a user behavior score based on the user behavior model, the request and recent contextual user behavioral data in accordance with an embodiment. The system starts by observing an event associated with a user device. When an event is observed, the system determines whether a rule is triggered by observed event (operation 400). When a rule is triggered, the user behavior score is adjusted either upwards or downwards. For example, the system may determine a user behavior score based on the user's calling records. An observed event could be an incoming call, an outgoing call, or initiation of a mobile application from the mobile phone, etc.

In one embodiment, the system monitors the user's calling records, including but not limited to, identity of incoming callers, identity of recipients for outgoing calls, call durations, voice analysis of sound input from the microphone, etc. If no rule is associated with the observed event, the system decreases the user's behavioral score based on the lapsed time (operation 410). Otherwise, the system calculates a quality measure associated with the event (operation 420). The quality measure is a scale indicating how likely an observed event is to happen for the user in the given context. For example, a quality measure can be based on the location of the device, and can be described by clusters of previous observed locations of the device. If a cluster of locations has more previous observations, it has a higher quality than a cluster of locations with fewer previous observations. Likewise, a cluster of locations with a small diameter has a higher quality than a cluster of locations with large diameter.

In addition to quality measures, the system also calculates a weight associated with the type of observation (operation 430). A weight is a scale that describes the relative importance of the particular type of observation for the purposes of asserting identity. As described above, there are many types of observations, e.g., location, identity of an incoming caller, call duration, etc. Each type of observation is associated with a weight. For example, for a user who works at regular hours in an office, the location of the device has great weight because it is very indicative of whether the device is being used by the user. By contrast, for a second user who often travels around without any fixed schedule, the location of the device has less weight than for the previous user. However, if the second user always reports to his or her boss on the road, the call recipient's identity has a great weight because it is indicative of the likelihood of the device being used by the user.

Next, the system determines whether the observed event is consistent with the user's ownership of the device (operation 440). If so, the user's behavior score is increased based on the quality measure and the weight (operation 480). On the other hand, if the observed user event is inconsistent with the user's ownership of the device, the user behavior score is decreased based on the quality measure and the weight (operation 450). In one embodiment, the system determines whether the user behavior score is below a predetermined threshold value (operation 460). If so, the system requests the user to authenticate himself explicitly to the application or service (operation 470). This may be achieved using a variety of authentication methods. The choice of which authentication method to use may depend on the user behavior score. For example, the user may be asked to enter a password and to present a security token if the user behavior score is too low. Alternatively, the user may be asked to enter a password if the user behavior score is below the threshold value but not low enough for presenting the security token.

In embodiments of the present invention, the user behavior score is adjusted periodically. In the mobile phone example illustrated above, positive data means that the calling records show that the user is likely to make or receive a phone call at the time of calling for the duration of the call to/from the other person. Some events regarded as positive data increase the user behavior score slowly, for example, "good" call activities (e.g., calling home or a family member), "good" location, "good" trace of device movement (e.g., moving from home location to office location), an accelerometer movement (which indicates that the user device is not forgotten), etc. On the other hand, some events regarded as positive data increase the user behavior score quickly. These events include: successful password authentications; combinations of attributes performed by a legitimate user (e.g., calls to the same number from the same location); successful pairings with devices that are unlikely to be stolen at the same time (e.g., car, work computer); WiFi authentications (which requires password); etc.

Negative data means that the calling records show that the user is unlikely to make/receive the phone call at the time of calling for the duration of the call to/from the other person. Some events regarded as negative data ruin the score slowly, for example, the passing of time. Other events regarded as negative data ruin the score quickly. These events include: "bad" call activities (e.g., calling 1-900 numbers or making international calls); activities at unusual times (e.g., out late at night or making phone calls late at night); failed logins; etc. Also, attempts to access high-value information will decrease a user's user behavior score significantly. High-value information includes calling records and other data that could allow the user to generate fake good activity and could be used to boost the score.

In accordance with one embodiment, positive data slowly and gradually increases the user behavior score. As a result, to maintain a high user behavior score, a user needs to build upon positive data continuously over a period of time, rather than instantly boosting it. In contrast, negative data could decrease a user's behavioral score very quickly. Moreover, in the example above, the user behavioral score is largely influenced by the context of the phone call. To illustrate this scenario, imagine that a user may receive one point for calling a frequent contact on the address book of the mobile phone, one point for being physically located at a frequent location, etc. However, the same user may receive three points for calling a frequent contact from a frequent location, and ten points for calling a frequent contact from the location the user normally calls that particular contact from. If the user calls an unusual number, e.g., with an area code that the user has never called before, the user could lose twenty-five points. Note that a user loses points quickly when negative data occur, but boosts points slowly over a period of time with positive data.

Nevertheless, some events can provide a very quick boost to a user's user behavior score. For example, if a user successfully logs in to an application, the user's behavioral score may be temporarily raised to the maximum value. In some embodiments, if a user successfully logs in to an application or service, it also serves to make up the points the user lost in association with the user's previous actions which caused the user to fall below the threshold. Accordingly, the previous actions are no longer regarded as negative data. Thus, the next time when the user performs the same actions, it is less likely that such actions would require any explicit authentication, such as entering a password.

In one embodiment, the calculation of the user behavior score is individualized. Different users may have different user behavior scores when performing the same or similar actions and/or combination of actions. In addition, different users may have different decay rates. A decay rate is a rate at which a previous event loses its contribution to the current user behavior score. In some embodiments, a large number and frequency of events are observed for a user, and thus each event decays at a relatively high rate. In other embodiments, few infrequent events are observed for a user, and thus each event decays at a relatively low rate.

Figure 5:
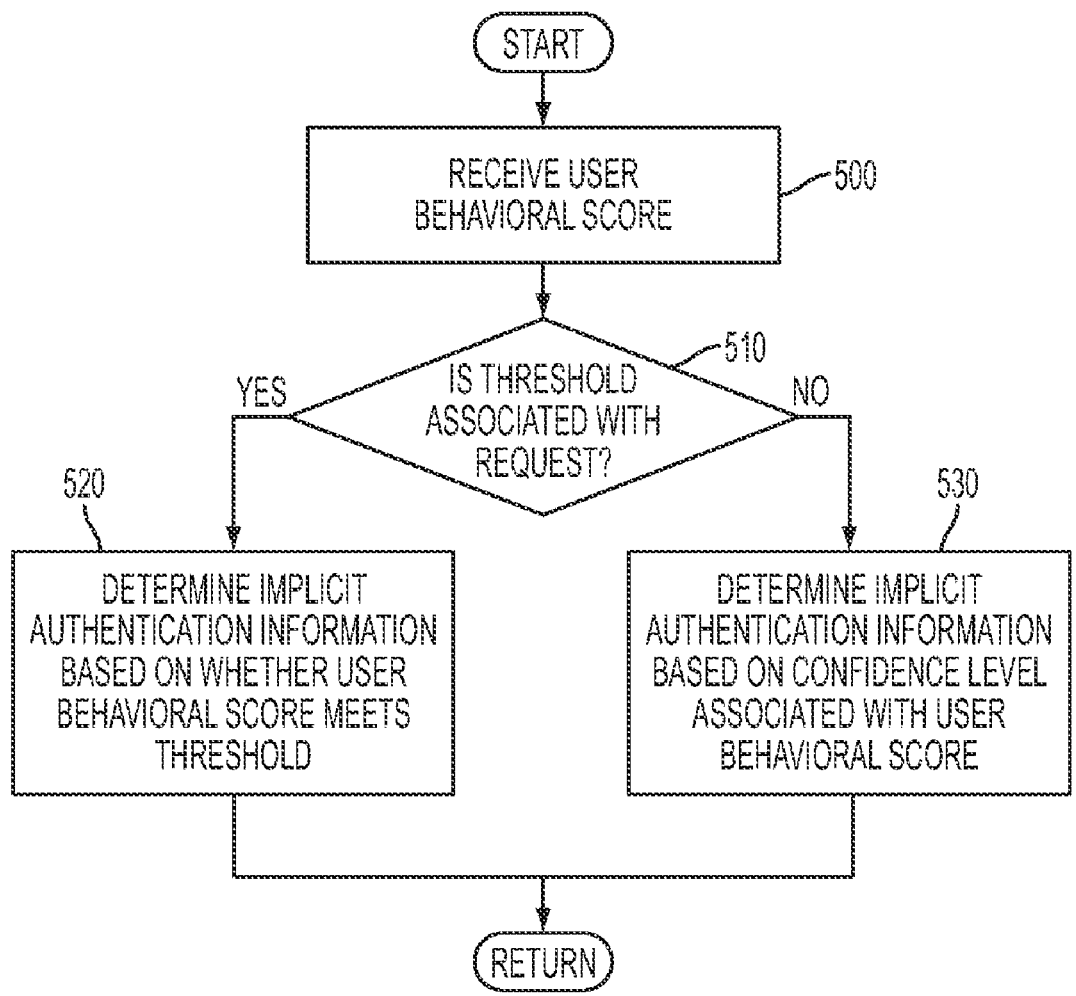
FIG. 5 shows a flow chart illustrating the calculation of implicit authenticating information in accordance with an embodiment of the present invention.

FIG. 5 shows a flow chart illustrating the calculation of implicit authenticating information based on the user behavior score in accordance with an embodiment. The implicit authenticator 270 receives a user behavior score 260 from the behavior score grader 250 (operation 500). The system then determines whether a threshold is associated with the user access request 210 (operation 510). In some embodiments, where a threshold value exists, the system evaluates the user behavioral score against the threshold value and determines whether to authenticate the user to access the controlled resource (operation 520). In other embodiments, where no threshold value exists, the system will evaluate the user behavioral score based on a confidence level associated with the user behavioral score (operation 530).

In a preferred embodiment, the authentication decision is application-specific. In some variations of the embodiment, the authentication decision may be used to unlock the entire device and all applications (also known as "all-or-nothing access"). In other variations, authentication decisions are fine-grained and application-specific depending on how much sensitive information an application carries and the user's user behavior score. For example, if an adversary user who steals the mobile device plays a game of Tetris on it, it is a less serious problem. On the other hand, if the adversary reads the emails and gains access to the owner's online bank account, it is disastrous. In one embodiment, a high confidence level associated with a high user behavior score can unlock an email application, whereas an average confidence level associated with a comparatively low user behavior score may only unlock games and non-privacy-sensitive applications. On the other hand, a high confidence level associated with a very low user behavior score may cause the whole device to lock.

Contextual Data

Figure 6:
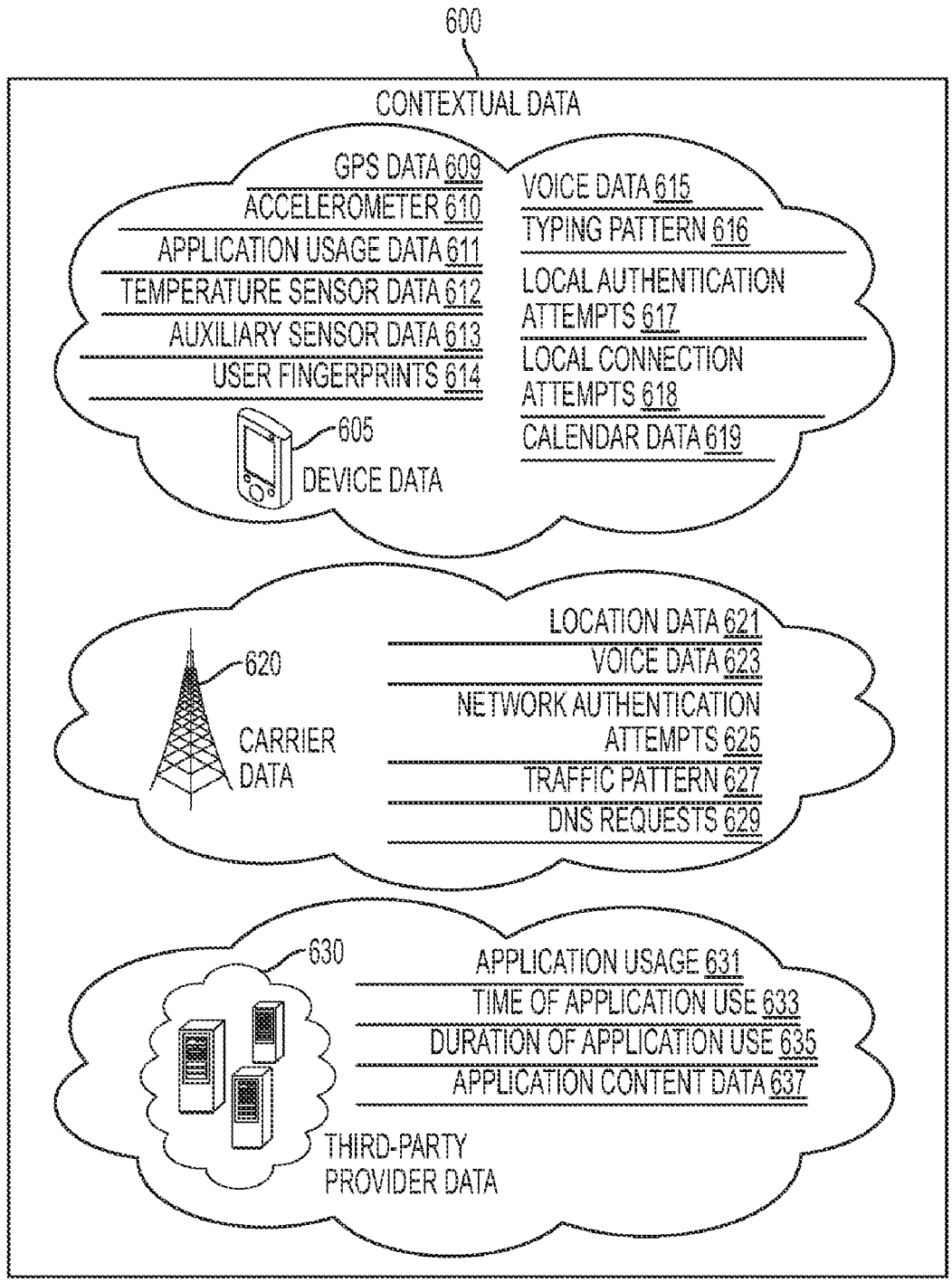
FIG. 6 shows a diagram of contextual data in accordance with an embodiment of the present invention.

FIG. 6 shows a diagram of contextual data 600 in accordance with an embodiment. The following types of contextual data 600 may be used to serve as indicators of a user's behavior: location; movements; actions; biometrics; other environmental data; co-location, including co-location with a wireless SSID, a mobile device, or a PC or laptop; recent authentication outcomes and scores; and application usage, such as web search queries or web browsing history; etc. Contextual data collected from one or more user devices may include multiple data streams, the combination of which provides basis for the determination of the user behavior score. However, each data stream alone provides insufficient basis for the determination of the user behavior score. A data stream is a stream of data of any type described herein.

The contextual data 600 can be grouped into three classes based on the data sources used to make authentication decisions: device data 605 which are data primarily available on the device; carrier data 620 which are data available to the carrier; and third-party provider data 630 which are data available to other application and/or service providers. Note that a specific data type may belong to more than one class. To which class data of such data types belongs may depend on user choices, or on different forms and quality of the data for different classes. Also, some of the data types are device-specific. That is, to which class data of such data types belongs depends on the type of hardware and the type of use of the data.

(1) Device Data 605

Many mobile devices are equipped with Global Positioning System (GPS), and have wireless support, such as WiFi and Bluetooth™. Measurements of GPS data 609 can be used to determine location and co-location. Many mobile devices also have accelerometers 610, whether to help protect hard drives or to augment GPS data. Also, multi-purpose devices have information about application usage, and such information may be stored as application usage data 611. Such devices may also have a user's social membership information and user demographic data. In addition, devices with fans have built-in temperature sensors, which generate temperature sensor data 612.

Moreover, almost all devices with user interfaces enable traditional biometric-style measurements, such as keyboard typing patterns 616 and voice data 615. Touch-screen devices may be able to gather user fingerprints 614, or at least measure the size and shape of any portion of fingers in contact with the screen. Many devices will likely have user-configured auxiliary sensors, e.g., to monitor the user's pulse and blood pressure. These user-configured auxiliary sensors may generate auxiliary sensor data 613.

An important piece of data relates to the success of local authentication attempts 617 and local connection attempts 618, e.g., password entry and synchronization with already registered devices such as laptops and cars. Finally, there is contextual data, such as calendar data 619 containing the contents of calendar entries, and web browser data containing sites visited.

(2) Carrier Data 620

Carrier data can include location data 621 which approximate location of the device as identified by a selected cell phone tower. The location data 621 also give a crude estimation of a co-location. In some embodiments, carriers may have access to voice data 623. The carrier may know whether recent network authentication attempts 625 succeeded. Whereas carriers typically would not have access to the content of the data streams, they will often be able to determine the likely application sources of data requests by the traffic patterns 627, and will often have access to DNS requests 629.

(3) Cloud Data or Third-Party Provider Data 630

Contextual data 600 may be available from an increasing number of applications hosted on the network by third-party providers. For example, third-party providers may have information about application usage 631, time of the application use 633, and duration of the application use 635. In addition, third-party providers may also have application content data 637, such as calendar entries.

Contextual data 600 can be represented in various ways. Some contextual data 600 are taken in snapshot forms; others are continuous traces from the recent past. In some embodiments, data may be represented as a result of a Fourier transform. In some embodiments, data can be rounded or approximated in different ways. For example, location data could correspond to representations meaning "at home," "at mall," "at work," etc. Finally, data of several categories can be combined to create new data classes.

Note that carriers are well-suited to be the trusted third party in charge of making authentication inferences and communicating trust statements to qualified providers, because of both their already established trust relationship with the consumer and their natural ability to communicate with the consumer devices. In other words, a carrier may serve carrier data 620 under one context and third-party provider data 630 under a different context. Network service providers are not only producers of data, but also consumers of trust statements. They would make decisions as to whether to require an explicit authentication based on such trust statements from the carriers. When an explicit authentication session is required, the network third-party service providers feed back the outcome of this authentication step to the trusted carriers. It is possible to enroll devices, which cannot be used to sense or report events and are therefore unable to generate device data, in the system disclosed herein by relying on carrier data, and on data from network service providers.

User Behavior Model

FIG. 7A shows a diagram of a user behavior model describing the user's historical behavior patterns in accordance with an embodiment. A new profile is created to model a user's behavior pattern for each new user in the system. In one embodiment, the system creates the new profile with the weights corresponding to a national average. The system can create a new profile with weights computed based on quick profiling, such as importing a phone bill, or survey data. The system can also create a new profile by inheriting contextual information about the user from another device associated with the user, such as devices the user currently owns or previously owned and devices owned or previously owned by people associated with the user. The system does not require a password until the weights have stabilized in some way. In some embodiments, the system can require a password for selected events until the weights have stabilized.

In the mobile phone example illustrated above, a user behavior model 760 can be conceptually built upon six different types of contextual data: phone number 700, call type 710, duration of the phone call 720, location of the phone call 730, movement of the phone 740, and identity confidence 750. The phone number 700 refers to the number associated with calls to or from the mobile phone. Phone numbers may be unregistered or registered, e.g., "wife," "mother," "daughter," "son," "coworker," etc. The call type 710 refers to the type of phone calls involved, e.g., incoming, outgoing, missed, forwarding, conferencing, etc. The duration 720 of the call can be classified into different categories. In the example illustrated in FIG. 7A, the duration of phone calls is classified into at least five categories: less than 5 minutes, between 5 and 10 minutes, between 10 and 30 minutes, between 30 and 60 minutes, and over 60 minutes. The location 730 refers to the location of the mobile phone as indicated, for example, by the GPS data. Locations may be either unregistered or registered, e.g., "home," "school," "work," "grocery store," etc. The movement 740 describes the speed at which the mobile device is detected to move. In this example, the movement may be undetected, static, slow, medium, and fast. Finally, the identity confidence 750 indicates the level of confidence that the user is the person using the mobile device. In some embodiments, identity confidence may be classified into categories, such as >95%, 90-95%, 80-90%, 70-80%, . . . <10%, etc. A user behavior model 760 describes a user's behavior pattern by associating different data types together. In the example illustrated in FIG. 7A, the first row of the user behavior model 760 indicates that there is greater than 95% chance that the device is being used by its intended user when the user receives a phone call at home from his wife and talked for over an hour. As another example, the second row of the user behavior model 760 also indicates it is quite likely that the device is with its intended user when the user calls his wife's phone number for five minutes from a known grocery store. By contrast, the fifth row of the user behavior model 760 indicates that there is less than 10% chance that the user is the owner of the mobile device when the user calls a coworker's number in a fast-moving vehicle from an unknown location for over an hour.

The above-described user behavior model 760 is merely one embodiment of many possible conceptual models. It is not intended to be exhaustive or to limit the present invention to the forms disclosed. In addition to the six data types, the user behavior model 760 may depend on other types of data as described in FIG. 6 in addition to or instead of the six data types herein. Each type of data involved in the user behavior model 760 may be classified differently or may not be classified into categories at all. The user behavior model 760 described here is for easy conceptual understanding. The actual design and storage of the user behavior model 760 may vary in different systems.

Figure 7B:
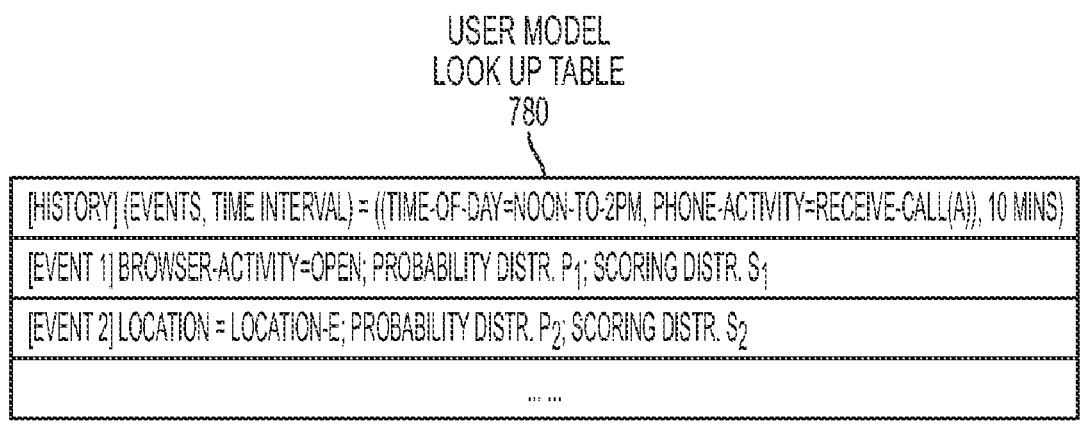
FIG. 7B shows a user model look-up table used to store a user behavior model in accordance with an embodiment of the present invention.

FIG. 7B shows a user model look-up table 780 used to store a user behavior model in accordance with an embodiment. Users can be characterized by their usage behavior patterns. The system models each user using a look-up table 780 that contains history strings, which are matched with the current history, and a plurality of events information. The table is indexed by the history strings. A history string contains a sequence of observed events, along with the time interval of the sequence. An event entry typically includes a probability distribution and a scoring distribution. The probability distribution corresponds to how likely the associated event is to happen as a function of time. In other words, the probability distribution corresponds to the frequencies of past observations of events. The scoring distribution, on the other hand, is associated with how many points are given to or taken from the user behavior score as a result of the event as a function of time. The scoring distribution depends not only on the probability distribution, but also on the significance of the event, and on whether it is regarded as positive data or negative data. Note that the times for these distributions are not absolute. Rather, they are relative to the time of occurrence of the last event in the history string.

FIG. 7B provides an example table entry:

[History] (events, time interval)=((time-of-day=noon-to-2 pm, phone-activity=receive-call(A)), 10 minutes)

[Event 1] browser-activity=open; probability distr. $P_1$; scoring distr. $S_1$

[Event 2] location=location-E; probability distr. $P_2$; scoring distr. $S_2$

The table entry contains history information and information about a collection of events with associated probability distributions and scoring distributions. The history information may be used to identify whether a condition is satisfied as will be explained below.

This entry is interpreted as follows:

Assume that the following ordered observations have been made within a ten-minute interval: "The time of day is between noon and 2 pm" and "the person receives a call from A." Therefore, Event 1 that "the person opens a web browser" would occur with probability distribution $P_1$. Similarly, Event 2 that "the person is at location E" would occur with probability distribution $P_2$.

In one embodiment, a rule refers to a history string and an associated event. A rule is triggered if all of the associated events occur within the right time interval corresponding to the maximum time associated with the probability distribution. When a rule is triggered, the user behavior score of the user is modified by adding to it the score corresponding to the scoring distribution for the appropriate time. In some embodiments, a given rule can only be triggered once by one unique sequence of events. However, if the same sequence occurs again, the same rule will be triggered again.

Apparatus for Implicit Authentication

Figure 8:
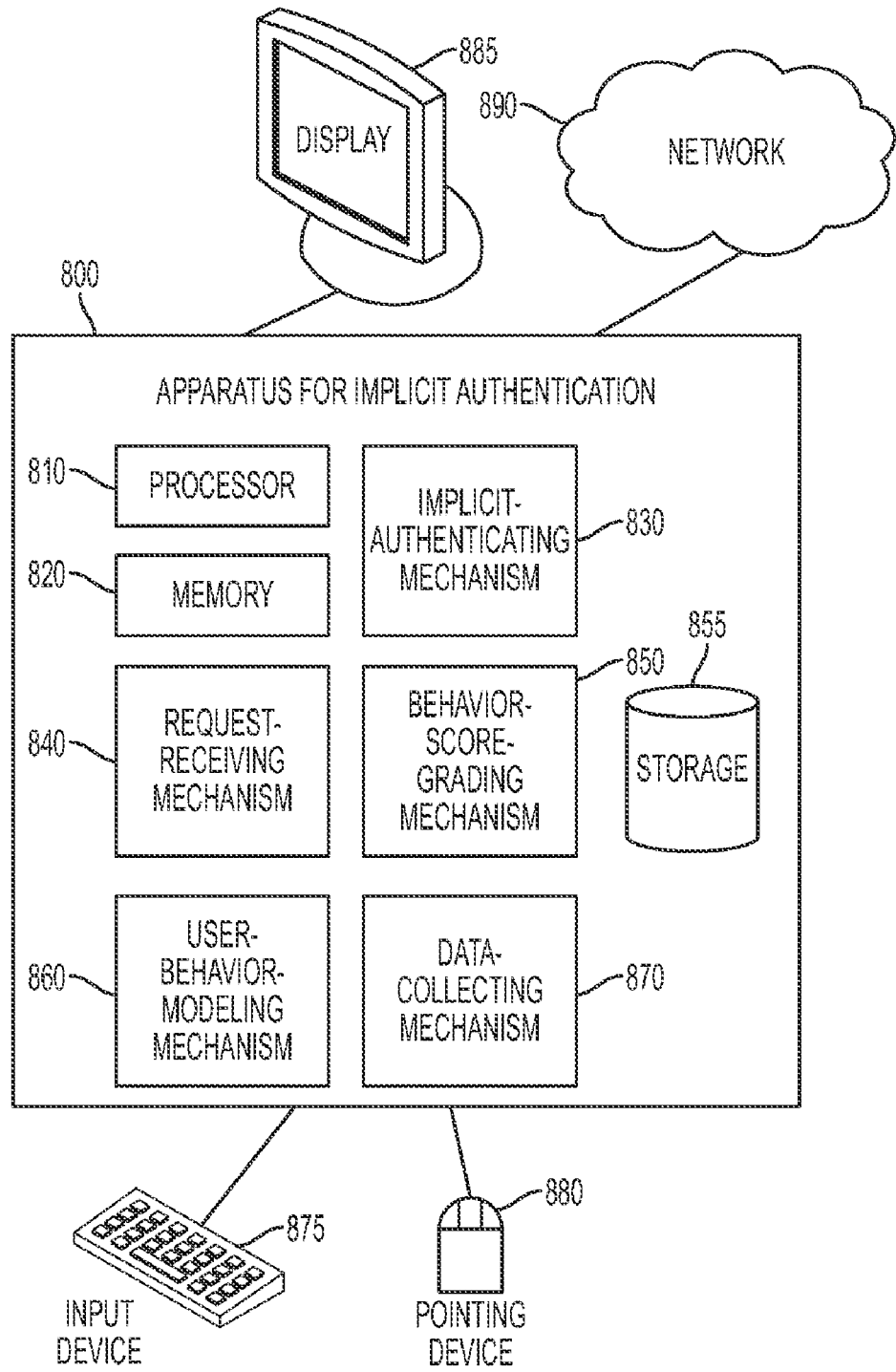
FIG. 8 shows a block diagram of an apparatus for implicitly authenticating a user to access a controlled resource in accordance with an embodiment of the present invention.

FIG. 8 shows a block diagram of an apparatus 800 for implicitly authenticating a user to access a controlled resource in accordance with an embodiment. The apparatus 800 includes a processor 810, a memory 820, a request-receiving mechanism 840, a user-behavior-modeling mechanism 860, an implicit-authenticating mechanism 830, a behavior-score-grading mechanism 850, a data-collecting mechanism 870, and storage 855. The apparatus 800 can be coupled with a display 885, a network 890, an input device 875 and a pointing device 880.

The implicit-authenticating mechanism 830 calculates the implicit authentication information based on the user behavior score. The implicit-authenticating mechanism 830 can be any computing component with a processing logic.

The request-receiving mechanism 840 receives a user access request from a user. The request-receiving mechanism 840 can be a network port, a wireless receiver, a radio receiver, a media receiver, or any other receiving component without limitations.

The behavior-score-grading mechanism 850 calculates a user behavior score of the user who initiates the user access request. The behavior-score-grading mechanism 850 can be any computing component with a processing logic and a communication mechanism. The communication mechanism includes a mechanism for communicating through a cable network, a wireless network, a radio network, a digital media network, etc., without any limitations.

The user-behavior-modeling mechanism 860 creates a user behavior model based on the contextual data about a user collected by the data-collecting mechanism 870. The user-behavior-modeling mechanism 860 can be any type of computing component with a computational mechanism.

The data-collecting mechanism 870 collects contextual data about the user. The data-collecting mechanism 870 can be any device with a communication mechanism and can work with the storage 855. In some embodiments, the data-collecting mechanism 870 sends the collected recent contextual data to the behavior-score-grading mechanism 850. In other embodiments, the data-collecting mechanism 870 sends the contextual data to the user-behavior-modeling mechanism 860.

The storage 855 can include, but is not limited to, a random access memory (RAM), flash memory, a magnetic storage system, an optical storage system, and magneto-optical storage devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for implicitly authenticating a user to access a controlled resource, the method comprising:
    receiving, from a computing device, a request to access the controlled resource;
    selecting a user behavior model for the user, wherein the user behavior model is derived from historical contextual data of the user;
    determining recent contextual data of the user, wherein the recent contextual data are collected from one or more user devices without prompting the user to perform an action associated with authentication, and wherein the recent contextual data comprise a plurality of data streams which provide a basis for determining whether the user owns the computing device;
    determining a user behavior score which indicates a likelihood that the user owns the computing device, wherein determining the user behavior score involves:
        observing a recent event that is associated with the user's computing device;
        calculating a quality measure for the recent event, and a weight associated with a type of the observation;

determining that the observed recent event is consistent with the user behavior model; and adjusting the user behavior score based on the quality measure and the weight; and providing the user behavior score to an access controller of the controlled resource, wherein the access controller facilitates access to the controlled resource for the user in response to the user behavior score exceeding a predetermined threshold value.

2. The method of claim 1, further comprising:

collecting contextual data of the user periodically from the one or more user devices; and updating the user behavior model based on the collected contextual data of the user.

3. The method of claim 2, further comprising:

determining that the user behavior score is higher than a predetermined threshold value; and authenticating the user to access the controlled resource using an authentication decision derived from the user behavior score.

4. The method of claim 3, wherein the authentication decision derived from the user behavior score is used to adjust an assurance associated with another form of authentication.

5. The method of claim 1, wherein the historical contextual data are collected with a number of measurements, and wherein the user behavior model describes a past user behavior pattern by a combination of one or more measurements.

6. The method of claim 1, wherein the recent contextual data of the user comprise data from at least one of the following sources:

device data that are available on a user device;

carrier data that are available to a network carrier; and third-party provider data that are available to a third-party provider providing an application to the user.

7. The method of claim 1, wherein the recent contextual data of the user comprise one or more of: GPS data, accelerometer data, voice data, sensor data, application usage data, web browser data, authentication attempts, connection attempts, network traffic patterns, DNS requests, typing patterns, biometric data, social group membership information, and user demographics data.

8. The method of claim 1, wherein the user behavior model is stored in a user model look-up table, the look-up table comprising:

historical information on whether a condition is satisfied; and information on a plurality of events, each event being associated with a probability distribution and a scoring distribution.

9. The method of claim 1, further comprising collecting the historical contextual data via one or more of a survey of contextual information about the user entered by a representative of the user, an accumulation of periodically transmitted contextual data of the user from one or more devices, or an inheritance of the contextual information about the user from another device associated with the user.

10. The method of claim 1, further comprising deriving the user behavior model from a second user behavior model of a group of users sharing similar characteristics.

11. The method of claim 1, further comprising determining whether a recent user event is consistent with a past user behavior pattern, wherein the recent event belongs to one of a plurality of categories, the plurality of categories comprising one or more of: a very positive event, a positive event, a neutral event, a negative event, and a very negative event; and wherein the determination of adjusting the user behavior score and the amount of adjustment are associated with the category to which the recent event belongs.

12. A system for implicitly authenticating a user to access a controlled resource, the system comprising:

a user access request receiver configured to receive a request, from a computer device, to access the controlled resource;

a selection mechanism configured to select a user behavior model for the user, wherein the user behavior model is derived from historical context data of the user;

a determination mechanism configured to determine recent contextual data of the user, wherein the recent contextual data are collected from one or more user devices without prompting the user to perform an action associated with authentication, and wherein the recent contextual data comprise a plurality of data streams which provide a basis for determining whether the user owns the computing device;

a behavioral score grader configured to determine a user behavior score which indicates a likelihood that the user owns the computing device, wherein while determining the user behavior score the behavioral score grader is further configured to:

observe a recent event that is associated with the user's computing device;

calculate a quality measure for the recent event, and a weight associated with a type of the observation;

determine that the observed recent event is consistent with the user behavior model; and adjust the user behavior score based on the quality measure and the weight; and an authentication information provision mechanism configured to provide the user behavior score to an access controller of the controlled resource, wherein the access controller is configured to facilitate access to the controlled resource for the user in response to the user behavior score exceeding a predetermined threshold value.

13. The system of claim 12, further comprising:

a contextual data collector configured to collect contextual data of the user periodically from the one or more user devices; and a user behavior modeler configured to update the user behavior model based on the collected contextual data of the user.

14. The system of claim 13, further comprising:

a determining mechanism configured to determine that the user behavior score is higher than a predetermined threshold value; and an implicit authenticator configured to authenticate the user to access the controlled resource using an authentication decision derived from the user behavior score.

15. The system of claim 14, wherein the authentication decision derived from the user behavior score is used to adjust an assurance associated with another form of authentication.

16. The system of claim 12, further comprising a contextual data collector configured to collect the historical contextual data with a number of measurements, wherein the user behavior model describes a past user behavior pattern by a combination of one or more measurements.

17. The system of claim 12, wherein the recent contextual data of the user comprise data from at least one of the following sources:

device data that are available on a user device;

carrier data that are available to a network carrier; and third-party provider data that are available to a third-party provider providing an application to the user.

18. The system of claim 12, wherein the recent contextual data of the user comprise one or more of: GPS data, accelerometer data, voice data, sensor data, application usage data, web browser data, authentication attempts, connection attempts, network traffic patterns, DNS requests, typing patterns, biometric data, social group membership information, and user demographics data.

19. The system of claim 12, wherein the user behavior model is stored in a user model look-up table, the look-up table comprising:
   historical information on whether a condition is satisfied; and
   information on a plurality of events, each event being associated with a probability distribution and a scoring distribution.

20. The system of claim 12, further comprising a contextual data collector configured to collect the historical contextual data via one or more of a survey of contextual information about the user entered by a representative of the user, an accumulation of periodically transmitted contextual data of the user from one or more devices, or an inheritance of the contextual information about the user from another device associated with the user.

21. The system of claim 12, further comprising a model-deriving mechanism configured to derive the user behavior model from a second user behavior model of a group of users sharing similar characteristics.

22. The system of claim 12, wherein the behavior score grader is further configured to determine whether a recent user event is consistent with a past user behavior pattern;
   wherein the recent event belongs to one of a plurality of categories, the plurality of categories comprising one or more of: a very positive event, a positive event, a neutral event, a negative event, and a very negative event; and
   wherein the determination of adjusting the user behavior score and the amount of adjustment are associated with the category to which the recent event belongs.

23. A non-transitory computer-readable storage medium storing instructions that when executed by a computer cause the computer to perform a method for implicitly authenticating a user to access a controlled resource, the method comprising:
   receiving a request, from a computer device, to access the controlled resource;
   selecting a user behavior model for the user, wherein the user behavior model is derived from historical contextual data of the user;
   determining recent contextual data of the user, wherein the recent contextual data are collected from one or more user devices without prompting the user to perform an action associated with authentication, and wherein the recent contextual data comprise a plurality of data streams which provide a basis for determining whether the user owns the computing device;
   determining a user behavior score which indicates a likelihood that the user owns the computing device, wherein determining the user behavior score involves:
      observing a recent event that is associated with the user's computing device;
      calculating a quality measure for the recent event, and a weight associated with a type of the observation;
      determining that the observed recent event is consistent with the user behavior model; and
      adjusting the user behavior score based on the quality measure and the weight; and
   providing the user behavior score to an access controller of the controlled resource, wherein the access controller facilitates access to the controlled resource for the user in response to the user behavior score exceeding a predetermined threshold value.

* * * * *